(12) United States Patent
Outhred et al.

(10) Patent No.: US 10,778,507 B2
(45) Date of Patent: Sep. 15, 2020

(54) LOCALIZING NETWORK FAULTS THROUGH DIFFERENTIAL ANALYSIS OF TCP TELEMETRY

(71) Applicant: Microsoft Technology Licensing, LLC, Redmond, WA (US)

(72) Inventors: Geoff Outhred, Seattle, WA (US); Selim Ciraci, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 15 days.

(21) Appl. No.: 16/289,505

(22) Filed: Feb. 28, 2019

(65) Prior Publication Data
US 2019/0199580 A1 Jun. 27, 2019

Related U.S. Application Data

(62) Division of application No. 15/235,375, filed on Aug. 12, 2016, now Pat. No. 10,263,835.

(51) Int. Cl.
*H04L 12/24* (2006.01)
*H04L 12/26* (2006.01)
*H04L 29/06* (2006.01)

(52) U.S. Cl.
CPC ........ *H04L 41/0677* (2013.01); *H04L 41/069* (2013.01); *H04L 43/04* (2013.01); *H04L 43/0864* (2013.01); *H04L 69/163* (2013.01); *H04L 41/046* (2013.01); *H04L 43/028* (2013.01)

(58) Field of Classification Search
None
See application file for complete search history.

(56) References Cited

U.S. PATENT DOCUMENTS

| 2017/0126789 A1* | 5/2017 | Kondapalli | H04L 43/026 |
| 2017/0187570 A1* | 6/2017 | Estrada | H04L 41/0893 |
| 2017/0264493 A1* | 9/2017 | Cencini | G06F 1/26 |

* cited by examiner

*Primary Examiner* — Saumit Shah
(74) *Attorney, Agent, or Firm* — Ray Quinney & Nebeker P.C.; James Bullough

(57) ABSTRACT

A server includes a processor and memory. An operating system is executed by the processor and memory. A network interface is run by the operating system and sends and receives flows using transmission control protocol (TCP). An agent application is run by the operating system and is configured to a) retrieve and store TCP telemetry data for the flows in a flow table; b) move selected ones of the flows from the flow table to a closed connections table when the flow is closed; and c) periodically send the flow table and the closed connections table via the network interface to a remote server.

20 Claims, 9 Drawing Sheets

LOCALIZING NETWORK FAULTS THROUGH DIFFERENTIAL ANALYSIS OF TCP TELEMETRY

CROSS-REFERENCE TO RELATED APPLICATION

This application is a divisional of U.S. patent application Ser. No. 15/235,375 filed on Aug. 12, 2016. The aforementioned application is expressly incorporated herein by reference in its entirety.

FIELD

The present disclosure relates to computer networks, and more particularly to systems and methods for localizing network faults.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network engineers usually rely on network packet captures to localize network connectivity problems. Although effective, packet captures are usually not running at the time that connectivity issues occur. The network engineers typically initiate long running packet captures and/or try to reproduce the connectivity issues. The former approach is costly in terms of processing power. The latter approach is difficult and complex to perform since data center networks include many interacting components. Therefore, it is usually cumbersome to replicate a state of the network at the time that the connectivity issue occurred.

SUMMARY

A server includes a processor and memory. An operating system is executed by the processor and memory. A network interface is run by the operating system and sends and receives flows using transmission control protocol (TCP). An agent application is run by the operating system and is configured to a) retrieve and store TCP telemetry data for the flows in a flow table; b) move selected ones of the flows from the flow table to a closed connections table when the flow is closed; and c) periodically send the flow table and the closed connections table via the network interface to a remote server.

In other features, the agent application is configured to clear flow entries in the closed connection table after c). The agent application is configured to set TCP telemetry data of flow entries in the flow table to 0 after c). The agent application is further configured to aggregate the TCP telemetry data prior to sending the TCP telemetry data in c). The agent application is further configured to filter the TCP telemetry data prior to sending the TCP telemetry data in c).

In other features, the agent application is further configured to monitor an activity state of flow entries in the flow table and to selectively change a state of the flow entries in the flow table. The agent application is further configured to move one of the flow entries having an inactive state to the closed connection table when a new flow is reported.

A server includes a processor and memory. An operating system is executed by the processor and memory. A network interface is run by the operating system. A flow processing application is run by the operating system and is configured to a) receive flow tables including aggregated transmission control protocol (TCP) telemetry data for active flow entries via the network interface from a plurality of remote servers; b) receive closed connections tables including aggregated TCP telemetry data for inactive flow entries via the network interface from the plurality of remote servers; c) geo-tag flow entries in the flow table and the closed connections table based on locations of the plurality of remote servers; and d) forward the TCP telemetry data with geo-tags to a data store.

In other features, the flow processing application is configured to aggregate at least one of a number of flows, failed flows, new flows, closed flows and terminated flows between Internet protocol (IP) sources and IP destinations during an aggregation interval. The flow processing application is configured to aggregate at least one of a number of bytes sent and received, bytes posted and bytes read between Internet protocol (IP) sources and IP destinations during an aggregation interval.

In other features, the flow processing application is configured to calculate at least one of a mean round trip time and a maximum round trip time between Internet protocol (IP) sources and IP destinations during an aggregation interval.

In other features, the flow processing application is configured to calculate mean size of a congestion window and a number of times the congestion window is reduced between Internet protocol (IP) sources and IP destinations during an aggregation interval.

In other features, the flow processing application is further configured to identify and authenticate the flow table and the closed connection table using a unique identification corresponding to one of the plurality of remote servers. The flow processing application is further configured to filter the TCP telemetry data.

A server includes a processor and memory. An operating system is executed by the processor and memory. A network interface is run by the operating system. A differential data analyzing application run by the operating system is configured to a) receive and store TCP telemetry data with geo-tags from a remote server in a database; b) in response to a network error at a source server, retrieve the TCP telemetry data with geo-tags during a first period before the error began and during a second period after the error began or ended for the source server; c) in response to the network error at the source server, identify comparison servers communicating with the source server and retrieve the TCP telemetry data with geo-tags during the first period before the error began and during the second period after the error began or ended for the comparison servers; and d) perform at least one function on the TCP telemetry data with geo-tags for at least one of the source server and the comparison servers.

In other features, the at least one function includes aggregating the TCP telemetry data with geo-tags for the comparison servers. The at least one function includes normalizing the TCP telemetry data with geo-tags for the source server and the comparison servers.

In other features, the differential data analyzing application generates a table including normalized metrics for the source server arranged adjacent to normalized metrics for the comparison servers.

In other features, a trend analysis application is configured to compare the normalized metrics for the source server and the comparison servers to predetermined values and to generate a proposed diagnosis based on the comparison.

In other features, a web configuration application configures a plurality of remote servers in a push-based configuration or a pull-based configuration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Rather than using computationally-expensive, long-running packet captures, systems and methods according to the present disclosure use TCP telemetry data gathered from a transmission control protocol (TCP) stack at each server to localize connectivity issues. To ensure reliable delivery, the TCP stack already maintains the TCP telemetry data relating to the state of the network and a remote server that the server is communicating with.

Most modern operating systems (OS) (such as Windows 7 and above) provide application protocol interfaces (APIs) that allow access to TCP telemetry data to user level programs. Systems and methods according to the present disclosure include an agent application running at each server (or node) in a data center or other network location. The nodes or servers may be arranged in clusters that include a plurality of nodes. The data center may include a plurality of clusters.

The agent application collects the TCP telemetry data from the TCP stack. Since the TCP telemetry data is already gathered and maintained by the TCP stack, the process has minimal computational impact on the node. The agent application aggregates the TCP telemetry data and sends the TCP telemetry data to one or more other servers for analysis at predetermined intervals. At the analysis servers, the TCP telemetry data is geo-enriched. In other words, location information (such as cluster name or ID, domain name of the node, etc.) are added to the TCP telemetry data. The geo-enriched telemetry data is stored (or forwarded to another server) for further analysis.

When a connectivity issue from a first node (e.g. node1) to a second node (e.g., node2) occurs, the analysis server storing the TCP telemetry data identifies the top N talkers to node2. The top N talkers are nodes that are geographically close to node1 and transfer large volumes of data to node2. The analysis server performs one or more functions on the TCP telemetry data from the top N talkers around the time of the connectivity issue. In some examples, the functions include one or more of aggregation, averaging, normalizing and/or ranking. This generates a common view of the network from the top N talkers.

The TCP telemetry data from node1 to node2 is selected during a period starting before the connectivity issues began and ending after the connectivity issues began. The TCP telemetry data of the top N talkers to node2 is compared to the TCP telemetry data from node1 to node2. The TCP telemetry data that stands out during the comparison provides an indication of the location of the problem, as will be described further below.

For example, during the connectivity issue, both node1 and the top N talkers report connection failures to node2. The issue most likely involves node2. Whereas if connection failures are only reported by node1, then the problem is most likely with node1.

Figure 1A:
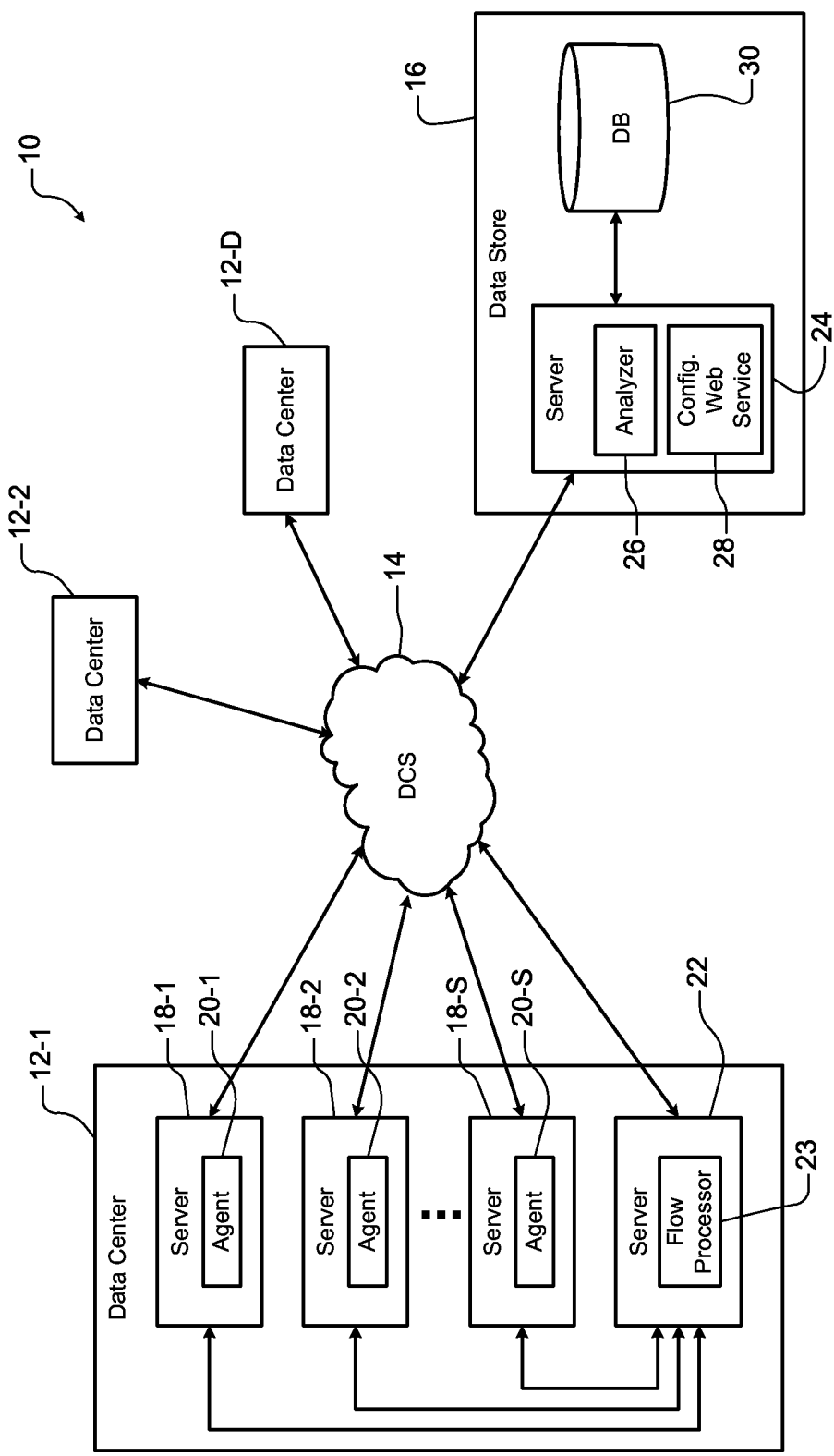
FIG. 1A is a functional block diagram of an example of a network including multiple data centers according to the present disclosure.
Figure 1B:
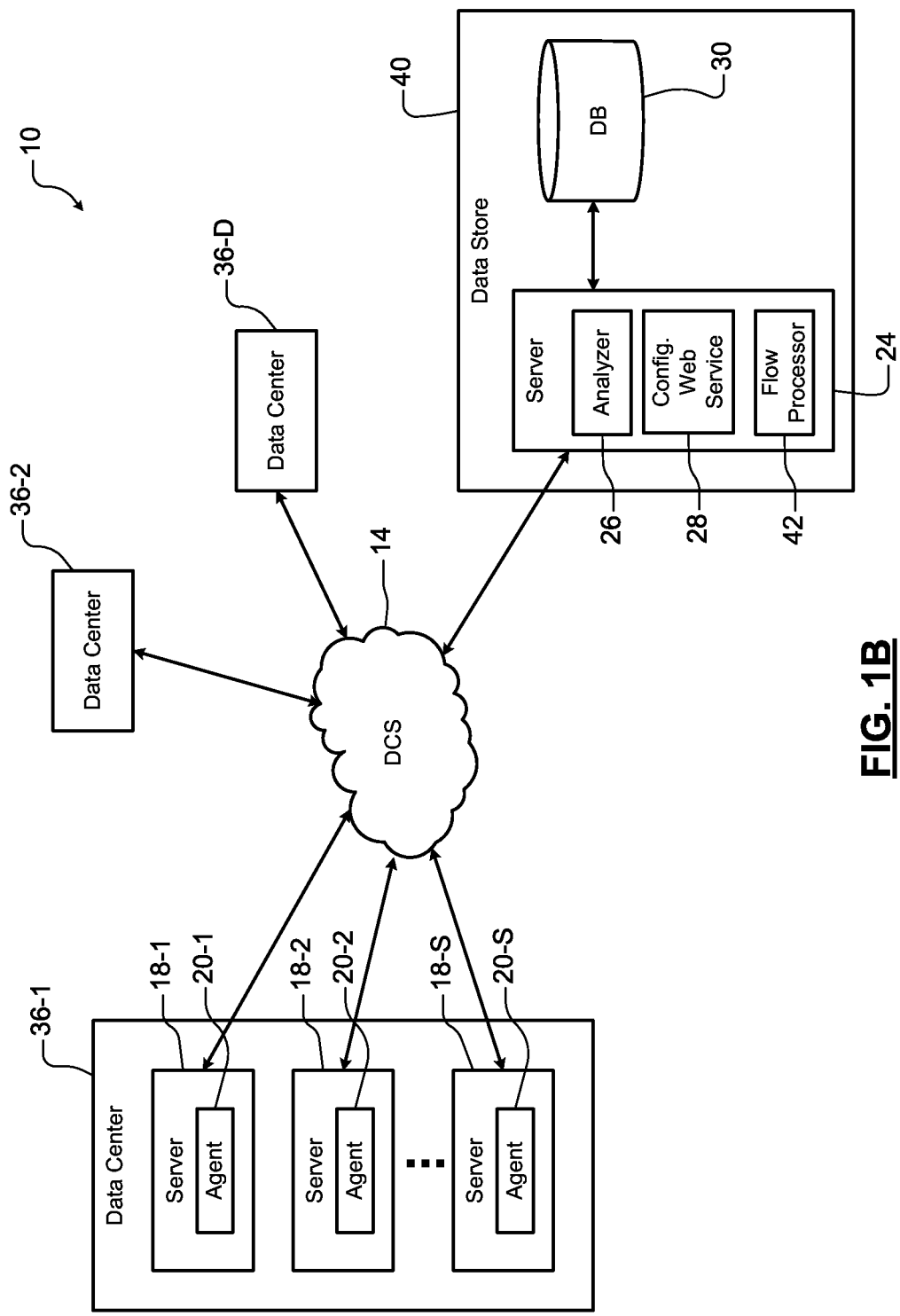
FIG. 1B is a functional block diagram of another example of a network including multiple data centers according to the present disclosure.

Referring now to FIGS. 1A and 1B, example network configurations for localizing network faults according to the present disclosure are shown. As can be appreciated, however, other network configurations can be used without departing from the scope of this disclosure. In FIG. 1A, a network 10 includes one or more data centers 12-1, 12-2, . . . , and 12-D (collectively data centers 12), where D is an integer greater than or equal to one. The data centers 12 send and receive data over a distributed communications system (DCS) 14. The DCS 14 may include as a wide area network (WAN) such as the Internet, a local area network (LAN), and/or other type of DCS. A data store 16 also sends and receives data to and from the data centers 12 over the DCS 14.

The data center 12-1 includes one or more servers 18-1, 18-2, . . . , and 18-S (collectively servers 18), where S is an integer greater than or equal to one. Each of the servers 18-1, 18-2, . . . , and 18-S includes an agent application 20-1, 20-2, . . . , and 20-S (collectively agent applications 20). Groups of the servers 18 can be arranged in clusters.

The data center 12-1 may further include a server 22 including a flow processing application 23. The flow processing application 23 periodically receives TCP telemetry data from the agent applications 20 in the servers 18. The flow processing application 23 processes the data and forwards processed TCP telemetry data to the data store 16. The data store 16 includes one or more servers 24 and a database (DB) 30 for storing TCP telemetry data. At least one of the servers 24 includes a data analyzing application 26 for performing differential and trend analysis on the TCP telemetry data from the flow processing application 23. The server 24 may also include a configuration web service 28 for configuring the servers 18 using push-based or pull-based techniques.

In FIG. 1B, another example network configuration is shown. In this example, a flow processing application 42 is associated with a data store 40. In other words, the flow processing application is implemented in the data store 40 rather than in data centers 36-1, 36-2, . . . , and 36-D (collectively data centers 36).

Figure 2:
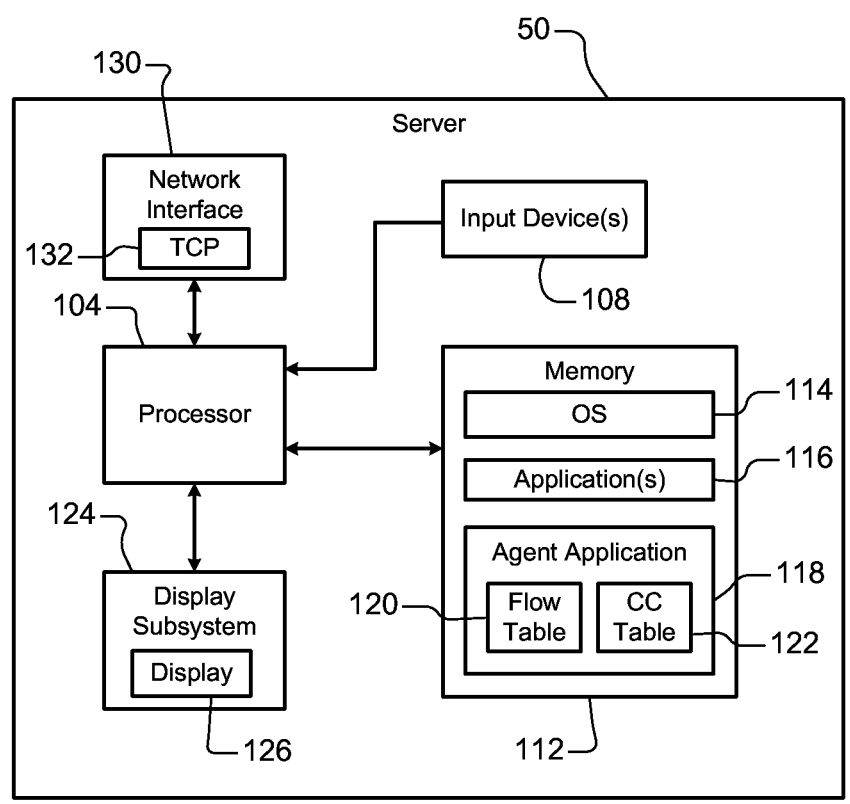
FIG. 2 is a functional block diagram of an example of a server including an agent application in the data center according to the present disclosure.

Referring now to FIG. 2, an example of a server 50 used in the data centers 12 or 36 is shown. The server 50 includes one or more processors 104 and memory 112. An operating system 114, one or more node application(s) 116 and an agent application 118 are executed by the processor 104 and memory 112 during operation. The agent application 118 maintains a flow table 120 and a closed connections table 122, as will be described further below. The agent application 118 periodically sends the flow table 120 and the closed connections table 122 to the flow processing application. The server 50 further includes a display subsystem 124 including a display 126. The server 50 communicates over the DCS 14 using a network interface 130. The network interface 130 sends and receives data using a transmission control protocol (TCP) 132.

Figure 3:
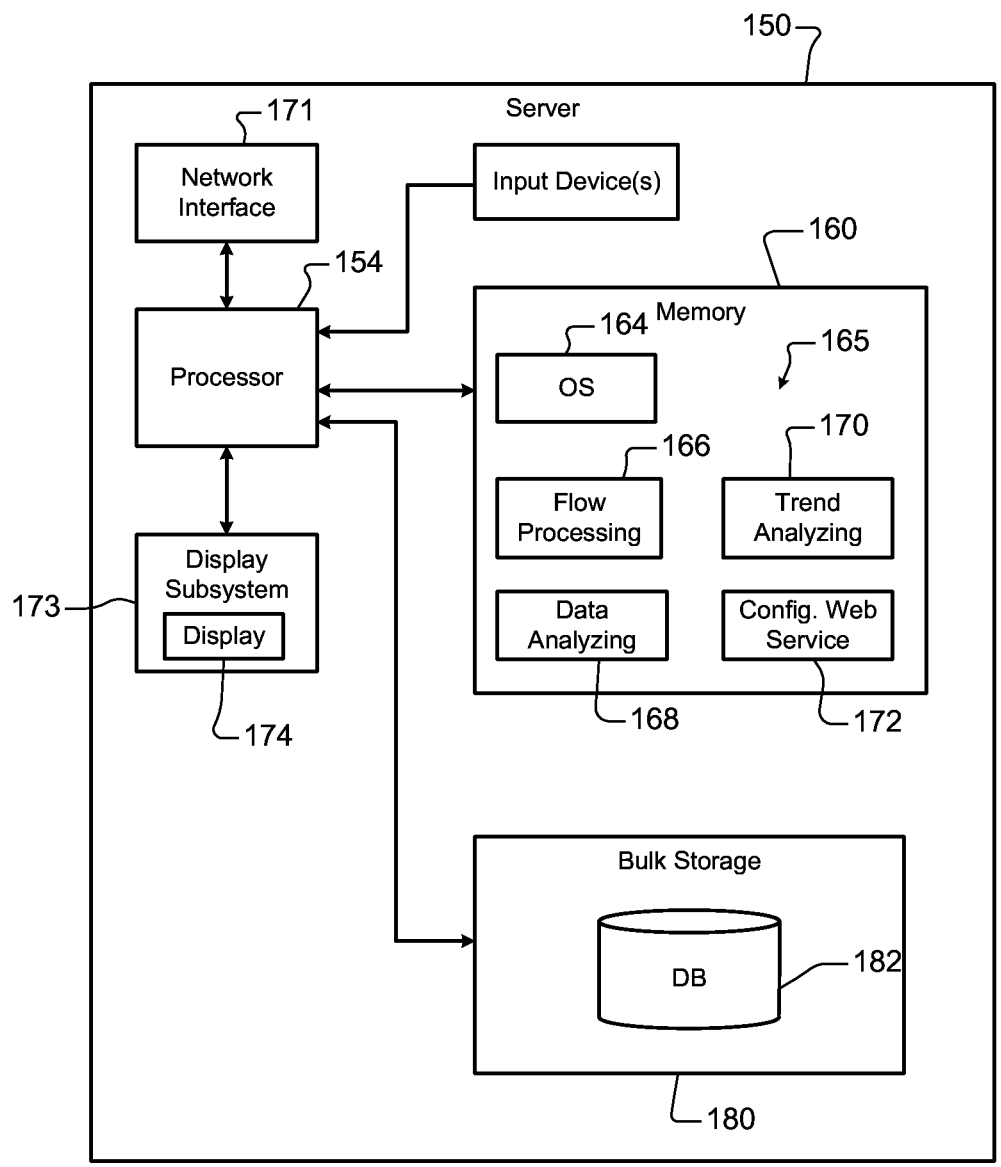
FIG. 3 is a functional block diagram of an example of server including a flow processor application according to the present disclosure.

Referring now to FIG. 3, an example of a server 150 used in the data store 16 is shown. The server 150 includes one or more processors 154 and memory 160. An operating system 164 and one or more applications 165 are executed by the processor 104 and memory 160 during operation. The applications 165 may include a flow processing application 166, a data analyzing application 168, a trend analyzing application 170 and/or a configuration web service application 172. While a single server is shown in FIG. 3, the applications 165 may be run on multiple local or remote servers.

The server 150 further includes a display subsystem 173 including a display 174. The server 150 communicates over the DCS 14 using a network interface 171. The network interface 171 sends and receives data using a transmission control protocol (TCP). The server 150 may include bulk storage 180 for locally storing a database 182. Alternately, the database 182 may be associated with another local or remote server (not shown).

Figure 4:
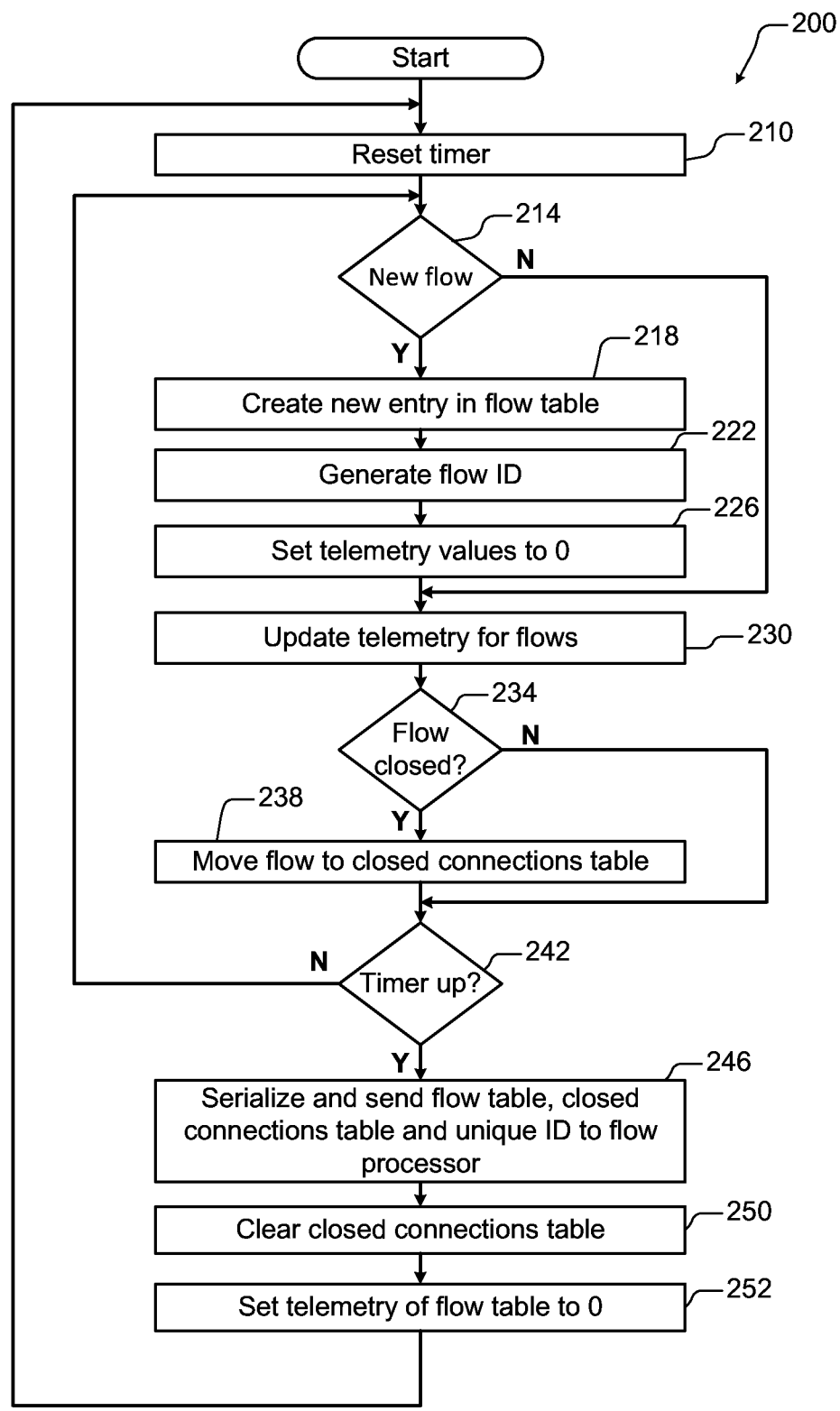
FIG. 4 is a flowchart of an example of a method performed by the agent application for generating and updating a flow table and a closed connections table according to the present disclosure.

Referring now to FIGS. 2 and 4, the agent application 118 collects, aggregates, and sends the TCP telemetry data for the flows. As used herein, a flow refers to a TCP connection 4-tuple including source Internet protocol (IP) address, source port, destination IP address, and destination port from one of the servers 18 in the data center 12. A fifth tuple defining flow direction may also be included. In order to ensure reliable delivery of packets, TCP gathers information about the state of the network and how the server application is sending/receiving data during the lifetime of the flow. The operating system 114 exposes this information to the agent applications 118.

In addition to the four-tuple, the agent application 118 uses the mechanisms provided by the OS 114 to collect one or more of types of TCP telemetry data about the flows from the TCP stack as set forth below in Table 1:

| | Metric |
|---|---|
| 1 | Bytes received. |
| 2 | Bytes sent. |
| 3 | Bytes delivered to the application (i.e., bytes read by the application). |
| 4 | Bytes application posted (i.e., the application written to the socket). |
| 5 | Round-trip time (RTT). |
| 6 | Flow state (closed, new, terminated (errored), failed (No response to TCP SYN)). |
| 7 | If the flow is terminated, the error code returned to the application. |
| 8 | TCP RSTs. |
| 9 | TCP congestion window size. |
| 10 | TCP received window size. |
| 11 | The amount of time spent in zero window probing. |

In FIG. 4, a method 200 for operating the agent application 118 is shown. At 210, a timer corresponding to an aggregation interval is reset. At 214, the agent application 118 determines whether a new flow has been received or sent by the server 50. If 214 is true, a new entry is created in the flow table 120 at 218. At 222, a flow identification (ID) that is unique is generated. At 226, the TCP telemetry values of the new entry are set equal to zero.

The method continues from 214 (if false) or 226 with 230 where the agent application 118 updates TCP telemetry data for the flows in the flow table 120. At 234, the agent application 118 determines whether a flow is closed. If 234 is true, the agent application 118 moves the flow to the closed connections table 122 at 238.

The method continues from 234 (if false) or 238 with 242. At 242, the agent application 118 determines whether the timer is up. If 242 is false, the method returns to 214. If 242 is true, the agent application 118 serializes and sends the flow table 120, the closed connections table 122 and the flow ID to the server associated with the flow processing application at 246. At 250, the agent application 118 clears flow entries in the closed connections table 122. At 252, the agent application 118 sets data of the flow entries in the flow table 120 to 0.

In some examples, the agent application 118 aggregates the TCP telemetry data about the flows at predetermined time intervals in order to reduce the volume of the TCP telemetry data to be sent from the node. In some examples, the predetermined time intervals are in a range from 5 seconds to 5 minutes, although other aggregation intervals may be used. In some examples, the flow ID is a unique hash calculated based on the TCP 4- or 5-tuple. In some examples when TCP reports a new flow, a flow entry is created in the flow table 120 with all of the associated telemetry values set to 0.

While the connection persists, the agent application 118 collects the TCP telemetry data from the TCP stack and performs aggregation or other functions on the TCP flow data including one or more of the following in Table 2:

| | Metric |
|---|---|
| 1 | Sum of bytes received. |
| 2 | Sum of bytes sent. |
| 3 | Sum of bytes delivered. |
| 4 | Sum of bytes posted. |
| 5 | Max RTT. |
| 6 | Update the flow state as reported by TCP. |
| 7 | Sum RST. |

| Metric | |
|---|---|
| 8 | Updated congestion widow as reported by TCP. |
| 9 | Calculated delta congestion window size as TCP reports a new congestion window. |
| 10 | Updated received window size as TCP reports the received window size from the flow |

When TCP stack reports that a flow is closed (terminated, failed, or successfully closed), the agent application 118 removes the flow from the flow table 120 and adds the information to the closed connections table 122. At the end of each aggregation interval, the agent application 118 serializes entries in the flow table 120 and the closed connections table 122 and sends the tables to the server with the flow processing application.

After sending the tables, the agent application 118 clears the closed connections table 122 and sets the associated telemetry for the flows in the flow table 120 equal to 0. In some examples, standard wire protocols for TCP telemetry, such as Internet Protocol Flow Information Export (IPFIX) and sFlow®, are used for serialization.

Generally, the servers 18 at the data centers 12 have many incoming and outgoing connections. As such, maintaining the flow table 120 for each connection may be too memory intensive. In some examples, an upper bound is set on the number of the flows that the agent application 118 maintains to reduce the required memory. With this limitation, capturing active flows becomes more important. In some examples, a flow is considered to be inactive if the TCP stack has not reported TCP telemetry changes during TCP session timeouts or if TCP reports only "keep-alive" events during TCP session timeouts.

Figures 5, 6:
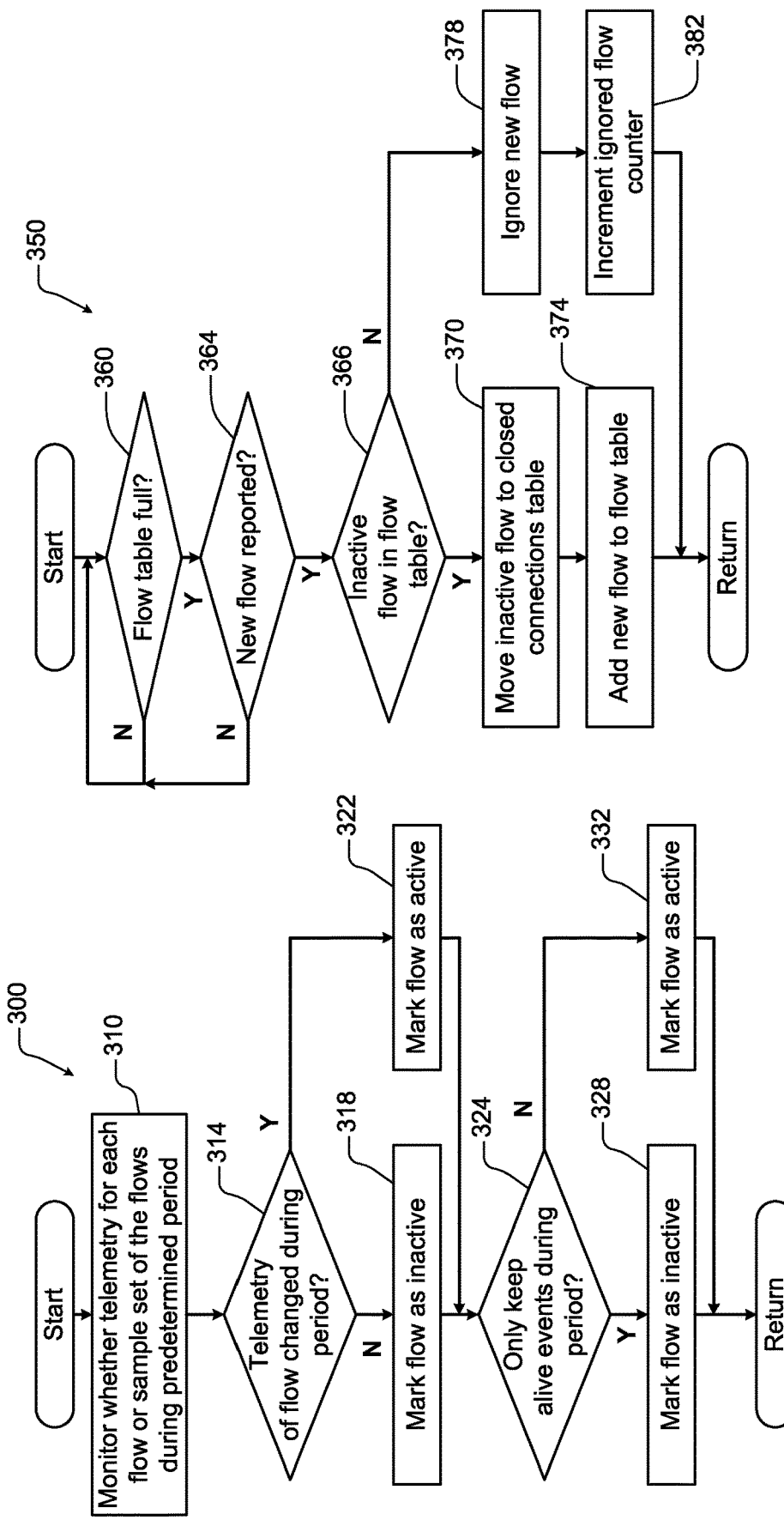
FIG. 5 is a flowchart of an example of a method performed by the agent application for determining an active or inactive state of a flow in the flow table according to the present disclosure.
FIG. 6 is a flowchart of an example of a method performed by the agent application for managing the flow table and the closed connections table according to the present disclosure.

Referring now to FIG. 5, a method 300 for changing an activity state of the flows is shown. At 310, the agent application 118 monitors whether TCP telemetry data for each flow or a sample set of the flows during the predetermined period. At 314, the agent application 118 determines whether the TCP telemetry data of the flow changed during the period at 318. If 314 is false, the flow is marked as inactive. If 314 is true, the flow is marked as active at 322. The method continues from 318 or 322 with 324. At 324, the agent application 118 determines whether only "keep alive" events occurred during the predetermined period for the flow. If 324 is true, the flow is marked as an inactive at 328. If 324 is false, the flow is marked as active at 332.

When the flow table 120 is full and TCP reports a new flow, the agent application 118 tries to open up space in the flow table 120 by moving inactive flows to the closed connection table. If there are no inactive flows, the agent application 118 drops the flow and ignores TCP telemetry data that is reported. At the end of the aggregation interval, the agent application 118 reports the number of flows that were ignored. The number of ignored flows can be used to configure a size of the flow table 120 for the server 50.

Referring now to FIG. 6, a method 350 for moving inactive flows from the flow table 120 to the closed connections table 122 is shown. At 360, the method determines whether the flow table 120 is full. If 360 is true, the method determines whether a new flow is reported at 364. If 364 is true, the method determines whether there are inactive flows in the flow table 120 at 366. If 366 is true, the inactive flows are moved to the closed connections table 122 at 370. At 374, the new flow is added to the flow table 120. If 366 is false, the new flow is ignored at 378. At 382, a flow counter is incremented (corresponding to a count of ignored flows).

With many active flows at a server, gathering the TCP telemetry data may be processor intensive. Instead of polling or handling each TCP event, the agent application 118 can be programmed to sample the flow events. Sampling strategies such as sampling N of M events (where N and M are integers and N<M), every other flow event, ¼ of the events, etc. can be employed. In some examples, TCP events relating flow state changes are captured (regardless of the sampling mechanism) to help the agent application 118 capture new active flows.

In some examples, the agent application 118 provides mechanisms for remote control and configuration. For example, operators need to be able to remotely turn on/off tracking, storage and/or forwarding of the TCP telemetry data. In some examples, the remote control is realized using a push- or pull-based approach. In the push based-approach, updates are sent to the agent application 118 directly. In this model, the agent application 118 needs to accept incoming connections.

In the pull-based approach, the agent application 118 actively polls for configuration updates. In some examples, a standard REST web service can be utilized to serve the configurations to the agent application 118s. At configurable intervals, the agent application 118 connects to the configuration web service 172 to check for updates to its configuration. In some examples, HTTPs or SSL connections are used for configuration updates to improve security. The pull-based approach for configuration updates also serves as heartbeats from the agent application 118. The heartbeats can be used to identify node failures either due to software or hardware errors and/or security issues such as distributed denial of service (DDOS) attacks or node compromises.

As described above, at the end of each aggregation interval, the agent application 118 sends the aggregated TCP telemetry data for each flow (stored in the flow table 120 and closed connections table) to the flow processing application. The agent application 118 sends the flow ID with the TCP telemetry data. In some examples, the flow ID is sent using the IPFIX domain ID field. The flow ID allows the flow processing application 166 to identify and authenticate the agent application 118 sending the TCP telemetry data. In some examples, flow ID is set at configuration time (i.e., when the agent application 118 is deployed to a server) or at runtime remotely when the agent application 118 asks for a configuration update.

Figure 7:
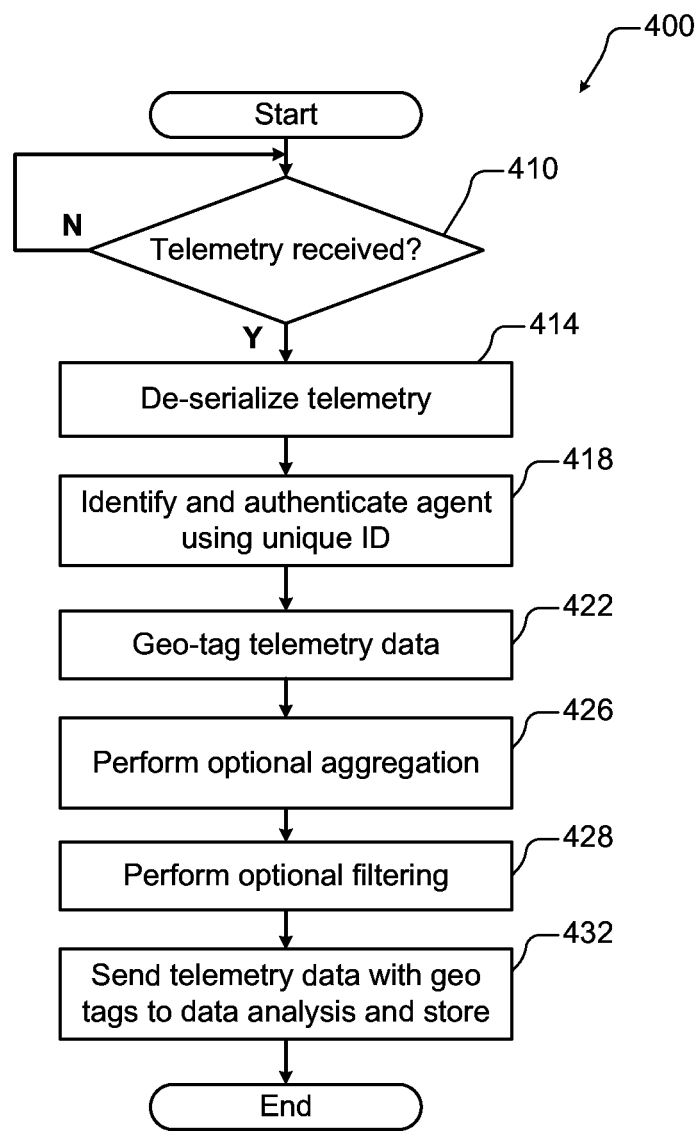
FIG. 7 is a flowchart of an example of a method performed by the flow processing application for processing the flow tables and closed connections table according to the present disclosure.

Referring now to FIG. 7, a method 400 for processing the flows at the flow processing application 166 is shown. At 410, the method determines whether the TCP telemetry data was received. At 414, the flow processing application 166 deserializes the TCP telemetry data. At 418, the flow processing application 166 identifies and authenticates the agent application 118 using the unique flow ID. At 422, the TCP telemetry data is geo-tagged. At 426 and 428, optional aggregation and/or filtering is performed. At 432, the TCP telemetry data with geo-tagging is sent to the data store.

In other words, the flow processing application 166 deserializes the TCP telemetry data and then tags the TCP telemetry data with location (or geo) information ("geo-tagging"). The geo-tagging enriches the TCP telemetry data with information about the location of the server. In some examples, this information includes but is not limited to the data center name/location, cluster name/cluster, and/or rack number/name/location of the node. The geo-tagging can be realized using the source IP of the TCP telemetry data or the flow ID.

After geo-tagging, the TCP telemetry data is sent to data store. In some examples, to reduce the volume of the TCP telemetry data, a secondary aggregation and/or filtering is applied by the flow processing application 166. The secondary aggregation can group the TCP telemetry data based on IP-IP pairs (i.e., all flows from one source IP to one destination IP), or source IP-destination IP:port pairs. In some examples, the aggregation is performed without losing semantics of the TCP telemetry data. Since nodes at the data center may run different applications, the source/destination port fields can be used for tagging and distinguishing the different applications. In some examples, the agent application 118 sends the name of the process establishing the flow.

Table 3 set forth below includes one or more examples of aggregation calculations or functions that can be generated:

| | Metric |
|---|---|
| 1 | Source: geo tag with source IP, and/or port (instead of port number, an application name can also be used). |
| 2 | Destination: geo tag with destination IP, and/or port (instead of port number, an application name can also be used). |
| 3 | Number of flows between source and destination |
| 4 | Number of "new" flows between source and destination (i.e., connections opened from source to destination during the aggregation period). |
| 5 | Number of "new" flows between source and destination (i.e., connections opened from source to destination during the aggregation period). |
| 6 | Number of closed flows (i.e., connections that are terminated successfully between source and destination during the aggregation period). |
| 7 | Number of terminated flows (i.e., connections that are established but terminated abruptly). |
| 8 | Number of failed flows (i.e., connections that could not be established). |
| 9 | Total traffic volume (bytes sent + received). |
| 10 | Total bytes posted by the application |
| 11 | Total bytes read by the application. |
| 12 | Max observed RTT |
| 13 | Mean observed RTT. |
| 14 | Number of retransmits. |
| 15 | Mean congestion window size. |
| 16 | Number of times congestion window size is reduced. |
| 17 | Mean received window size. |

In some examples, the flow processing application 166 performs filtering and selectively drops some of the TCP telemetry data relating to the flows that are not interesting. For example, filtering based on traffic volume (e.g., flows less than a predetermined number of bytes are dropped) and/or specific destination/source pairs. Flows can be filtered by the agent application 118 as well. For example, the filtering parameters can be configured using remote configuration updates to instruct the agent application 118 to not track flows to specified destination IP addresses and/or ports.

Analysis of the TCP telemetry data is performed to 1) identify possible locations of the fault using differential analysis, 2) identify trends that might indicate bad communication paths, and 3) provide real-time analysis that shows the application traffic and connection health between various network nodes.

Differential analysis is executed as network related errors are reported by the users. Given an error at time t, the TCP telemetry data from the source node (the node where the error is observed) is extracted for a sample time period. The sample time period starts a first period before the error began until a second period after the error began or ended. In some examples, first and second periods are multiples of either the initial aggregation interval (i.e. the aggregation applied by the agent application 118) or a secondary aggregation interval (i.e., the aggregation applied at the flow processing application 166).

Examples of the extracted data that is aggregated to calculate the metrics listed in Table 4:

| | Metric |
|---|---|
| 1 | % failed flows (or ratio of flows with syn failures to all flows). |
| 2 | % terminated flows (or the ratio of flows that are erroneously terminated to all flows) |
| 3 | Normalized retransmits (Number of retransmits/total traffic volume). |
| 4 | % flows with congestion window size reduction (or ratio of flows that has seen more congestion window size reduction than increase in the given aggregation period to all flows). |
| 5 | Max RTT |
| 6 | Application posted performance: total bytes posted/mean congestion window size. |
| 7 | Application read performance: total bytes delivered/total bytes read. |
| 8 | Total traffic volume |

In some examples, a ratio of all of the flows is used to normalize the data points. Normalization is performed to find the connections that have shown the most errors and transferred the least amount of data. As more flows are created, the probability of errors increases. In other examples, the data points are normalized by the total volume of traffic from source to destination (E.g., # TCP Syn time out/total volume of traffic).

After extracting the data for the source node, the TCP telemetry data for the comparison nodes are extracted from the data store for the same time period. Here, the comparison nodes are 1) geographically close to the source node and 2) top N talkers to the same destination as the source node.

The TCP telemetry data from each comparison node is aggregated to calculate the metrics listed in Table 4. Then, the TCP telemetry data from all of the comparison nodes are aggregated to formulate the TCP telemetry data that will be compared against the TCP telemetry data from the source node. Possible aggregations to formulate the comparative telemetry include but are not limited to median or 95th percentile of the metrics listed in Table 4 (a descriptive name such as "Top talkers" may be used for the source field). The aggregated telemetry from the comparison nodes and source node are placed side-by-side to formulate the differential analysis table.

Figure 8:
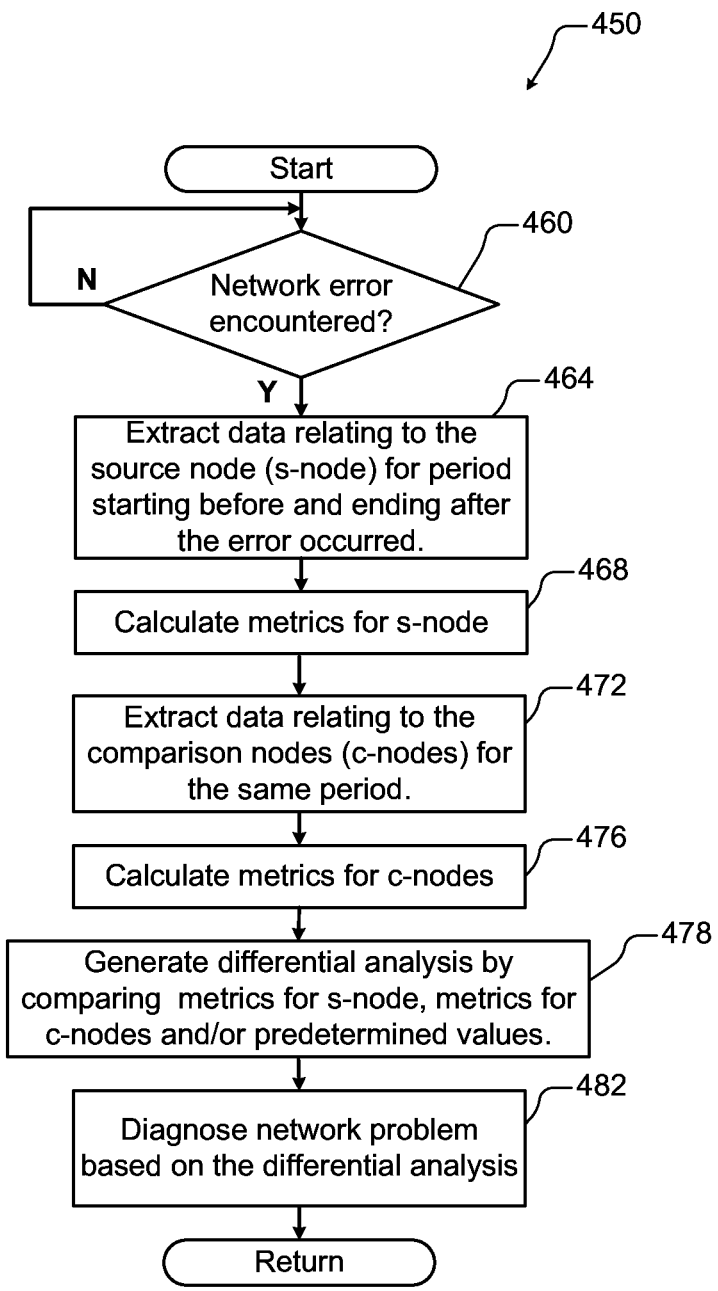
FIG. 8 is a flowchart of an example of a method performed by a differential data analyzing application according to the present disclosure.

Referring now to FIG. 8, a method 450 for performing data analysis is shown. At 460, the method determines whether a network error is encountered. When 460 is true, data is extracted relating to the source node starting before the air began and ending after the error began at 464. At 468, metrics are calculated for the source node. At 472, data is extracted relating to comparison nodes for the same period. At 476, metrics are calculated for the comparison nodes. At 478, differential analysis is generated by comparing metrics for the source node and the comparison nodes. In some examples, the differential analysis compares metrics for the source node, the comparison node and/or predetermined thresholds. At 482, the network is diagnosed based on the differential analysis.

Combined with the expertise on the network performance, the differential table shows which metrics peaked during the reported error and whether a similar peak is seen from some other nodes. Observing the peaks can yield discovery of patterns that indicates the location of the problem.

Common patterns generally indicate problems with the servers, network, or the client devices. Examples are set forth below in Table 5:

| Condition | Fault Indicated | Possible Explanation and Sample Thresholds |
|---|---|---|
| high % of failed connections from both the source node and comparison nodes | A fault in the network path between the source node, comparison nodes and the destination(s). | For example, the differential analysis may flag paths having failed connections greater than or equal to a predetermined percentage observed from both the source node and comparison nodes. In some examples, the predetermined percentage is equal to 10% or another value. The fact that the failed connections are observed from multiple locations is a strong indicator of a network problem. |
| High % of failed connections only from the source node (but not the comparison nodes) | Possible problem at the source node. | |
| High MAX RTT observed from source node | Possible problem at the source node. | In some examples, the differential analysis may flag source nodes having MAX RTT on the order of seconds. |
| High RTT from source node and comparison nodes | Possible problem with server side. | The server may be busy or some other software error might be slowing the responses on the server. In some examples, the differential analysis may flag RTT greater than 50 ms or 100 ms. |
| High % of terminated flows observed from source node and comparison nodes | Possible network problem. | In some examples, the differential analysis may flag failed connections greater than or equal to 10% observed from both the source node and comparison nodes. |
| High % of terminated flows observed only from source node | Possible server or a client side issue. | The single point of failure mainly points at the server abruptly terminating the connections from the source node. In some examples, the requests from the source node might be malformed or the server might be too busy to accept the requests from source node. |
| Low application read or post performance from source node | Possible problem with application or the environment (other running software) on the source node. | If compared to comparison nodes, the application read performance observed from the comparison node is low, then this indicates problems with application or the environment (other running software) on the source node. |

In some examples, trend analysis is conducted to identify possible bad paths of communication. The trend analysis includes first and second phases. The first phase is executed using a first timer period to extract connection quality metrics for each source and destination pair. In some examples, the source and destination pairs are IP-IP, pod-pod, etc. In some examples, the first period is equal to one hour, although other periods can be used.

Table 6 lists an example set of metrics that can be extracted during the first phase of the trend analysis:

| | Metric |
|---|---|
| 1 | Normalized failed flows: total number of failed flows from source to destination divided by the total traffic volume between source and destination. |
| 2 | Normalized # of retransmits: total number of TCP retransmits between source and destination divided by the traffic volume. |

-continued

| | Metric |
|---|---|
| 3 | Normalized # TCP connection terminations: total number of TCP connection terminations (i.e., RSTs) divided by the total traffic volume between source and destination. |
| 4 | Normalized congestion window size: Max observed Congestion window size divided by |

| Metric |
| --- |
| total traffic volume between source and destination. |

A second phase of the trend analysis is executed using a second timer period that is longer than the first timer period. For example, the first period can be 1 hour and the second period is 24 hours, although other periods can be used. In the second phase, the Top N (e.g, top 10, 20, and etc.) pairs for the metrics listed in Table 3 are identified for each period that the first phase is executed. In other words, the top N pairs with max normalized failed flows, normalized retransmissions, normalized TCP connection terminations, and minimum normalized congestion window size is calculated. Then, the source and destination pairs that appear the most in any of one the top N lists is identified. Because these source and destination pairs have shown certain anomalous behavior (e.g., more retransmits compared to other pairs), the network path between the source and destination is investigated further.

Figure 9:
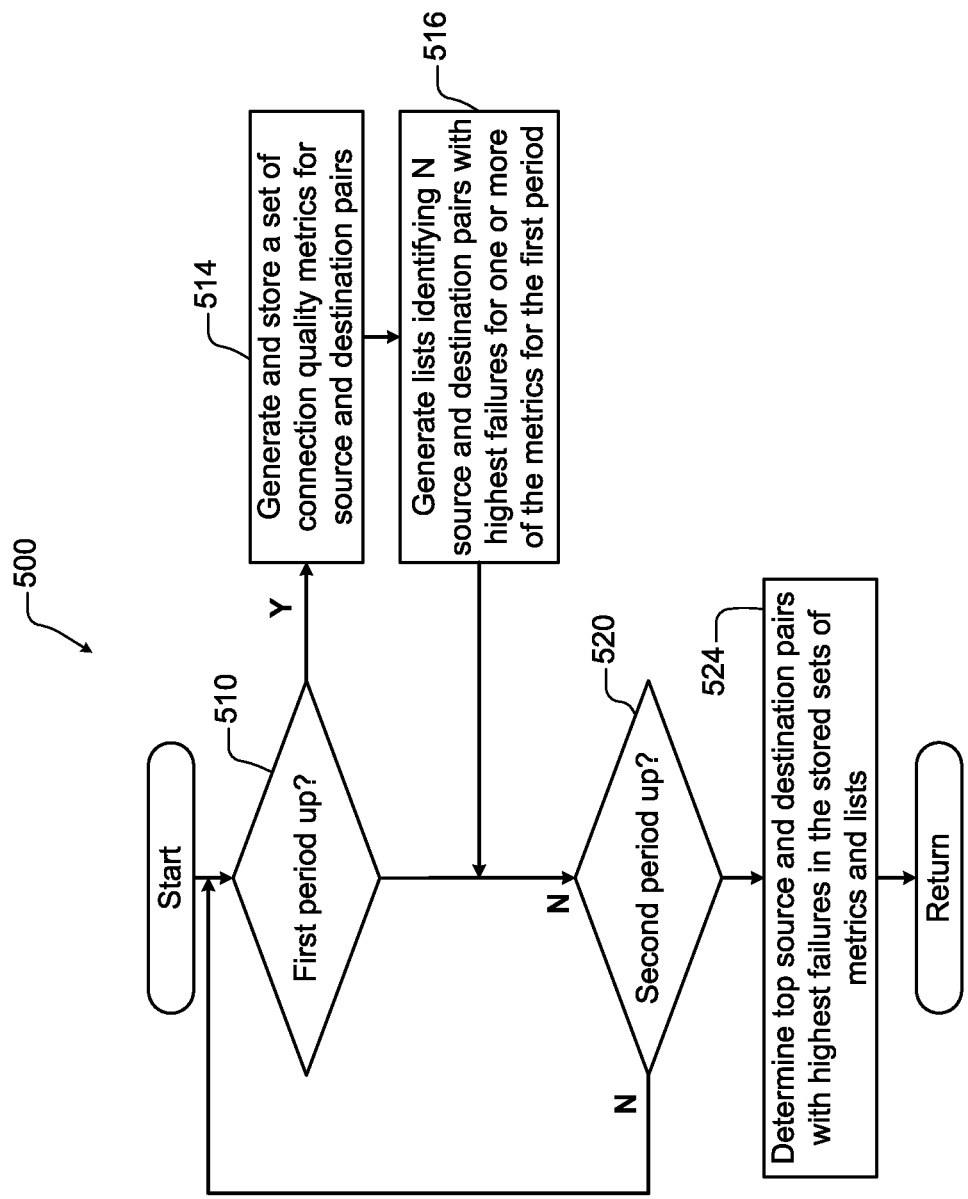
FIG. 9 is a flowchart of an example of a method performed by a trend analyzing application according to the present disclosure.

Referring now to FIG. 9, a method 500 for performing trend analysis is shown. At 510, if the first period of the first phase ends, a set of connection quality metrics is generated for source and destination pairs at 514. At 516, lists are generated and ranked to identify source and destination pairs with highest failures for one or more of the metrics for each of the first timer periods at 516. The method continues from 510 (if false) and 516 at 520. If the second timer period for the second phase is up at 520, a predetermined number of the top source and destination pairs with the highest failures in the stored sets of metrics and lists are determined at 524.

The systems and methods according to the present disclosure provide network engineers with insights on the state of the network in near real-time. The analysis is realized by coupling the data store with a user interface (UI) front-end. In some examples, the UI front end is generated using a framework such as Cabana, powerBI, etc. The UI provides a summary view of the network state. The summary includes aggregated TCP telemetry data or comparative views showing the network connection health of a node to other nodes in the cluster (average or 90th percentile of other nodes in the cluster).

In some examples, the summary view is used to identify possible network locations for further study. Once identified, the detailed analysis provided above can be used to further pinpoint problems. This view contains aggregated TCP telemetry data, the aggregations can be cluster to cluster and/or rack-to-rack. A summary view could consist of, for example, near real-time insights on the total volume of the traffic, the TCP measured RTT, syn timeout, connection terminations. On one hand, the total traffic volume can be used to identify applications heavily utilizing network and the RTT can show busy servers. On the other hand, the TCP terminations and failed flows (syn timeouts) can indicate reachability problems.

The comparative view always engineers to visually compare a node in a cluster/rack against all other nodes in the same cluster/rack (or vicinity) in near real-time. Here, the network state of the cluster/rack can be calculated using an aggregation function like average or percentiles (i.e., 90th percentile of the TCP telemetry such as RTT, bytes/s, and connection terminations). FIG. 2 depicts an example UI showing how Node 1 compares against all the nodes in the same cluster (cluster 1).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JSON (Javascript Object Notation) HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method, comprising:
receiving and storing transmission control protocol (TCP) telemetry data including associated geo-tags from a remote server in a database;
in response to identifying a network error at a source server:
retrieving the TCP telemetry data and associated geo-tags during a first period before the network error began and during a second period after the network error began or ended for the source server; and
identifying comparison servers communicating with the source server and retrieve the TCP telemetry data and associated geo-tags during the first period before the error began and during the second period after the error began or ended for the comparison servers; and
performing at least one function on the TCP telemetry data and associated geo-tags for at least one of the source server and the comparison servers.

2. The method of claim 1, wherein performing the at least one function on the TCP telemetry data comprises aggregating the TCP telemetry data and associated geo-tags for the comparison servers.

3. The method of claim 2, wherein aggregating the TCP telemetry data comprises grouping the TCP telemetry data within a table based on the associated geo-tags for the TCP telemetry data.

4. The method of claim 3, further comprising generating a diagnosis for the network error based on an analysis of the TCP telemetry data for respective groupings of the TCP telemetry data based on the associated geo-tags.

5. The method of claim 2, wherein aggregating the TCP telemetry data comprises aggregating the telemetry data based on identified pairings of internet protocol (IP) information from the associated geo-tags between source IP and destination IP.

6. The method of claim 1, wherein performing the at least one function on the TCP telemetry data comprises normalizing the TCP telemetry data and associated geo-tags for the source server and the comparison servers.

7. The method of claim 6, further comprising generating a table including normalized metrics for the source server arranged adjacent to normalized metrics for the comparison server.

8. The method of claim 7, further comprising:
comparing the normalized metrics for the source server and the comparison servers to predetermined values; and
generating a proposed diagnosis for the network error based on the comparison of the normalized metrics.

9. The method of claim 7, further comprising configuring a plurality of remote servers in a push-based configuration or a pull-based configuration.

10. The method of claim 1, wherein the associated geo-tags include location information about the remote server, wherein the location information comprises one or more of a cluster name, a cluster identifier, a domain name, a data center name, a data center location, a rack number, a rack name, a rack location, or an internet protocol (IP) address.

11. A system, comprising:
one or more processors;
memory in electronic communication with the one or more processors; and
instructions stored in the memory, the instructions being executable by the one or more processors to cause a server device to:
receive and store transmission control protocol (TCP) telemetry data including associated geo-tags from a remote server in a database;
in response to identifying a network error at a source server:
retrieve the TCP telemetry data and associated geo-tags during a first period before the network error began and during a second period after the network error began or ended for the source server; and
identify comparison servers communicating with the source server and retrieve the TCP telemetry data and associated geo-tags during the first period before the error began and during the second period after the error began or ended for the comparison servers; and
perform at least one function on the TCP telemetry data and associated geo-tags for at least one of the source server and the comparison servers.

12. The system of claim 11, wherein performing the at least one function on the TCP telemetry data comprises aggregating the TCP telemetry data and associated geo-tags for the comparison servers.

13. The system of claim 12, wherein aggregating the TCP telemetry data comprises grouping the TCP telemetry data within a table based on the associated geo-tags for the TCP telemetry data, and further comprising instructions executable by the one or more processors to cause the server device to generate a diagnosis for the network error based on an analysis of the TCP telemetry data for respective groupings of the TCP telemetry data based on the associated geo-tags.

14. The system of claim 11, wherein performing the at least one function on the TCP telemetry data comprises normalizing the TCP telemetry data and associated geo-tags for the source server and the comparison servers.

15. The system of claim 14, further comprising instructions executable by the one or more processors to cause the server device to:
 generate a table including normalized metrics for the source server arranged adjacent to normalized metrics for the comparison server;
 compare the normalized metrics for the source server and the comparison servers to predetermined values; and
 generate a proposed diagnosis for the network error based on the comparison of the normalized metrics.

16. A non-transitory computer-readable storage medium comprising instructions thereon that, when executed by one or more processors, causes a server device to:
 receive and store transmission control protocol (TCP) telemetry data including associated geo-tags from a remote server in a database;
 in response to identifying a network error at a source server:
  retrieve the TCP telemetry data and associated geo-tags during a first period before the network error began and during a second period after the network error began or ended for the source server; and
  identify comparison servers communicating with the source server and retrieve the TCP telemetry data and associated geo-tags during the first period before the error began and during the second period after the error began or ended for the comparison servers; and
 perform at least one function on the TCP telemetry data and associated geo-tags for at least one of the source server and the comparison servers.

17. The non-transitory computer-readable storage medium of claim 16, wherein performing the at least one function on the TCP telemetry data comprises aggregating the TCP telemetry data and associated geo-tags for the comparison servers.

18. The non-transitory computer-readable storage medium of claim 17, wherein aggregating the TCP telemetry data comprises grouping the TCP telemetry data within a table based on the associated geo-tags for the TCP telemetry data, and further comprising instructions that, when executed by the one or more processors, cause the server device to generate a diagnosis for the network error based on an analysis of the TCP telemetry data for respective groupings of the TCP telemetry data based on the associated geo-tags.

19. The non-transitory computer-readable storage medium of claim 16, wherein performing the at least one function on the TCP telemetry data comprises normalizing the TCP telemetry data and associated geo-tags for the source server and the comparison servers.

20. The non-transitory computer-readable storage medium of claim 19, further comprising instructions that, when executed by the one or more processors, cause the server device to:
 generate a table including normalized metrics for the source server arranged adjacent to normalized metrics for the comparison servers;
 compare the normalized metrics for the source server and the comparison servers to predetermined values; and
 generate a proposed diagnosis for the network error based on the comparison of the normalized metrics.

\* \* \* \* \*